(12) United States Patent
Williamson et al.

(10) Patent No.: US 8,317,344 B2
(45) Date of Patent: Nov. 27, 2012

(54) HIGH NA ANNULAR FIELD CATOPTRIC PROJECTION OPTICS USING ZERNIKE POLYNOMIAL MIRROR SURFACES

(75) Inventors: David M. Williamson, Tucson, AZ (US); Daniel G. Smith, Tucson, AZ (US)

(73) Assignee: Nikon Corporation, Chiyoda-Ku Tokyo (JP)

( * ) Notice: Subject to any disclaimer, the term of this patent is extended or adjusted under 35 U.S.C. 154(b) by 0 days.

(21) Appl. No.: 12/796,498

(22) Filed: Jun. 8, 2010

(65) Prior Publication Data

US 2011/0299184 A1   Dec. 8, 2011

(51) Int. Cl.
*G02B 5/10* (2006.01)
(52) U.S. Cl. .................................................. 359/858
(58) Field of Classification Search ........... 359/857–859
See application file for complete search history.

(56) References Cited

U.S. PATENT DOCUMENTS

| 2003/0081722 | A1* | 5/2003 | Kandaka et al. ............... 378/70 |
| 2003/0099034 | A1 | 5/2003 | Mann et al. |
| 2007/0058269 | A1 | 3/2007 | Mann et al. |
| 2007/0223112 | A1 | 9/2007 | Mann et al. |
| 2008/0165415 | A1 | 7/2008 | Chan et al. |
| 2008/0170216 | A1 | 7/2008 | Mann |
| 2008/0170310 | A1 | 7/2008 | Mann |
| 2009/0046357 | A1 | 2/2009 | Mann et al. |
| 2009/0051890 | A1 | 2/2009 | Mann et al. |
| 2009/0052073 | A1 | 2/2009 | Mann et al. |
| 2009/0079952 | A1 | 3/2009 | Mann |
| 2009/0262443 | A1 | 10/2009 | Mann et al. |
| 2010/0134907 | A1 | 6/2010 | Mann et al. |

FOREIGN PATENT DOCUMENTS

| WO | WO 2006/119977 | 11/2006 |
| WO | WO 2007/031271 | 3/2007 |
| WO | WO 2007/115596 | 10/2007 |
| WO | WO 2007/115597 | 10/2007 |

* cited by examiner

*Primary Examiner* — Euncha Cherry

(57) ABSTRACT

Optical structure and design concepts are provided, using a Y-Zernike polynomial, and by which optical components, optical components and optical structures, can be designed and produced, to image at extreme ultraviolet (EUV) wavelengths, at a relatively high NA (e.g. 0.35), with a relatively large field of view (e.g. 26×2 mm). Moreover, an optical structure produced according to the principles of the present invention has a small amount of asymmetry, which enables the components of the optical structure to be manufactured with current manufacturing techniques.

21 Claims, 7 Drawing Sheets

Figure 2. Catoptric projection optics, NA 0.35, 26x2 mm annular field

Standard Aspheric Surface $$sag = \frac{cr^2}{1+\sqrt{1-(1+k)c^2r^2}} + \sum_{j=2}^{5} a_j r^{2j}$$

- This is a typical (and probably the most popular) way of describing a rotationally symmetric surface
- r is the (un-normalized) radial position on the surface
- Surface is described with parameters
  - c = curvature
  - k = conic constant
  - $a_j$ = rotationally symmetric aspheric coefficients

Figure 4a

Typical Zernike Polynomial

| Index | Polynomial |
|---|---|
| 1 | 1 |
| 2 | $\rho \cos(\theta)$ |
| 3 | $\rho \sin(\theta)$ |
| 4 | $-1 + 2\rho^2$ |
| 5 | $\rho^2 \cos(2\theta)$ |
| 6 | $\rho^2 \sin(2\theta)$ |
| 7 | $\rho(-2+3\rho^2)\cos(2\theta)$ |
| 8 | $\rho(-2+3\rho^2)\sin(2\theta)$ |
| 9 | $1 - 6\rho^2 + 16\rho^4$ |
| 10 | $\rho^3 \cos(3\theta)$ |
| 11 | $\rho^3 \sin(3\theta)$ |
| 12 | $\rho^2(-3+4\rho^2)\cos(2\theta)$ |
| 13 | $\rho^2(-3+4\rho^2)\sin(2\theta)$ |
| 14 | $\rho(3 - 12\rho^2 + 4\rho^4)\cos(2\theta)$ |
| 15 | $\rho(3 - 12\rho^2 + 4\rho^4)\sin(2\theta)$ |
| 16 | $-1 + 12\rho^2 - 30\rho^4 + 20\rho^4$ |

$$Q_n^m(\rho) = \sum_{s=0}^{n-m}(-1)^s \frac{(2n-m-s)!}{s!(n-s)!(n-m-s)!}\rho^{2(n-m-s)}$$

$$Z_p(\rho,\theta) = Z_m^n(\rho,\theta) = Q_n^{|m|}\rho^{|m|} \times \begin{cases} \cos m\theta \text{ if } m \leq 0 \\ \sin m\theta \text{ if } m \leq 0 \end{cases}$$

Figure 4b

Zernike -> Y-Zernike Idea

Typical Zernike Polynomial Terms

| Index | Polynomial |
|---|---|
| 1 | 1 |
| 2 | $\rho \cos(\theta)$ |
| 3 | $\rho \sin(\theta)$ |
| 4 | $-1+2\rho^2$ |
| 5 | $\rho^2 \cos(2\theta)$ |
| 6 | $\rho^2 \sin(2\theta)$ |
| 7 | $\rho(-2+3\rho^2)\cos(2\theta)$ |
| 8 | $\rho(-2+3\rho^2)\sin(2\theta)$ |
| 9 | $1-6\rho^2+16\rho^4$ |
| 10 | $\rho^3 \cos(3\theta)$ |
| 11 | $\rho^3 \sin(3\theta)$ |
| 12 | $\rho^2(-3+4\rho^2)\cos(2\theta)$ |
| 13 | $\rho^2(-3+4\rho^2)\sin(2\theta)$ |
| 14 | $\rho(3-12\rho^2+4\rho^4)\cos(2\theta)$ |
| 15 | $\rho(3-12\rho^2+4\rho^4)\sin(2\theta)$ |
| 16 | $-1+12\rho^2-30\rho^4+20\rho^4$ |

Y-Zernike Polynomial Terms

| Index | Polynomial |
|---|---|
| 1* | 1 |
| 2 | $\rho \cos(\theta)$ |
| 3* | $-2\rho^2$ |
| 4 | $\rho^2 \cos(2\theta)$ |
| 5 | $\rho(-2+3\rho^2)\cos(2\theta)$ |
| 6* | $-6\rho^2+16\rho^4$ |
| 7 | $\rho^3 \cos(3\theta)$ |
| 8 | $\rho^2(-3+4\rho^2)\cos(2\theta)$ |
| 9 | $\rho(3-12\rho^2+4\rho^4)\cos(2\theta)$ |
| 10* | $-1+12\rho^2-30\rho^4+20\rho^4$ |

\* Rotationally symmetric terms have constant part removed

Figure 4c

Design Algorithm

- Start with a rotationally symmetric design (that is preferably well corrected)
- Convert one or more of the rotationally symmetric surfaces to the Y-Zernike description
- Include out-of-plane field points
- Optimize the new description to improve imaging at the new set of field points allowing the following additional variables
  - Non-symmetric terms in the Y-Zernike descriptions
  - Rotations of the surface about their x-axes
  - Decenters along y-axes

Figure 4d

HIGH NA ANNULAR FIELD CATOPTRIC PROJECTION OPTICS USING ZERNIKE POLYNOMIAL MIRROR SURFACES

BACKGROUND

The present invention relates to structure and process for producing optical components and optical structures that are particularly useful in a lithographic imaging optical system.

In imaging optical systems, e.g. microlithography imaging optical systems for imaging ("printing") a wafer, there is a continuing need for optical structures that can image ("print") small features on a sample such as a wafer that is imaged by the microlithography imaging system.

In addition, in the applicants' experience, there is also a need for optical structures that can image relatively small wavelengths (e.g. in the extreme ultra violet range), at relatively high numerical aperture (NA) with a large field of view and with small residual aberrations. Such optical structure is particularly desirable in a microlithography imaging optical system because it enables smaller features to be printed on a wafer with very small distortion.

Moreover, in the applicants' experience, if the amount of asymmetry of such optical structure is relatively small, the optical structure is also desirable because current manufacturing techniques can be used in the manufacture of the optical structure components.

SUMMARY OF THE PRESENT INVENTION

The present invention provides optical components, optical structure, and design concepts that address the foregoing needs. The principles of the present invention can be used to design optical components, and optical structures, that can be used, e.g. to image at extreme ultraviolet (EUV) wavelengths, at a relatively high NA (e.g. 0.35), with a relatively large field of view (e.g. 26×2 mm). Moreover, an optical structure produced according to the principles of the present invention has a small amount of asymmetry, which enables the components of the optical structure to be manufactured with current manufacturing techniques.

In one basic concept of the present invention, an optical mirror component for a projection optics system comprises an optical surface that is described by a Y-Zernike polynomial.

In another basic aspect of the present invention, an optical projection structure (e.g. for an imaging optical system) comprises one or more projection optics, at least one of which has an optical surface described by a Y-Zernike polynomial. A preferred form of the optical projection structure comprises an arrangement of six (6) mirrors, at least one of which has an optical surface described by a Y-Zernike polynomial. Moreover, in a particularly preferred form, all six mirrors have optical surfaces, and each of those optical surfaces is described by a Y-Zernike polynomial.

Yet another aspect of the present invention provides a method of designing an optical structure, comprising
a. providing a rotationally symmetric aspheric optical structure design,
b. electronically converting the optical surface(s) of one or more of the optical components of the rotationally symmetric optical structure to a Y-Zernike description,
c. providing a plurality of field points that are out of a plane of symmetry of the optical structure, and
d. electronically optimizing the description of the one or more components at the plurality of field points.

In all of the foregoing concepts, one or more optical components have optical Zernike polynomial. The Y-Zernike polynomial that is used to describe the one or more of the optical surfaces is preferably described in the following manner:

a. the Y-Zernike polynomial that describes the surface is given by equation (1), with reference to Table 1 and Table 2, $$sag(r, \theta) = \frac{cr^2}{1 + \sqrt{1 - (1+k)c^2 r^2}} + \sum_{p=1}^{N} A_p Z_p(r/R, \theta) \quad (1)$$

i. where c is the curvature of the surface given in Table 1 as "Curvature", k is the conic constant given in Table 1 as "C1", R is the normalizing radius given in Table 1 as "C2", and $\theta$ is the azimuthal angle measured from the y-axis and r the radial coordinate $r^2 = x^2 + y^2$;

ii. and where the individual polynomial terms of Equation (1) are defined by equations (2) through (5), with reference to Table 2, as follows:

$$Q_n^m(\rho) = \sum_{t=0}^{n-m} [1 - \delta_{t,0}\delta_{m,0} + \delta_{n,0}\delta_{m,0}] \frac{(-1)^{n-m-t}(n+1)!}{(n-m-t)!(m+t)!t!} \rho^{2t} \quad (2)$$

$$Z_p(\rho, \theta) = Q_{n(p)}^{m(p)}(\rho)\rho^m \cos m\theta \quad (3)$$

$$n(p) = \left\lceil \frac{\sqrt{1+8p}-3}{2} \right\rceil \quad (4)$$

$$m(p) = \frac{1}{2}[2 - 2p + (3 + n(p))n(p)] \quad (5)$$

where $\rho$ is the normalized radial coordinate r/R, $\theta$ is the azimuthal coordinate measured from the y-axis, and $\delta_{ij}$ is the Kronecker delta defined by equation (6) as follows:

$$\delta_{i,j} = \begin{cases} 1, & \text{if } i = j \\ 0, & \text{if } i \neq j \end{cases} \quad (6)$$

Other features of the present invention will become further apparent from the following detailed description and the accompanying drawings.

BRIEF DESCRIPTION OF THE DRAWINGS AND TABLES

Figure 1:
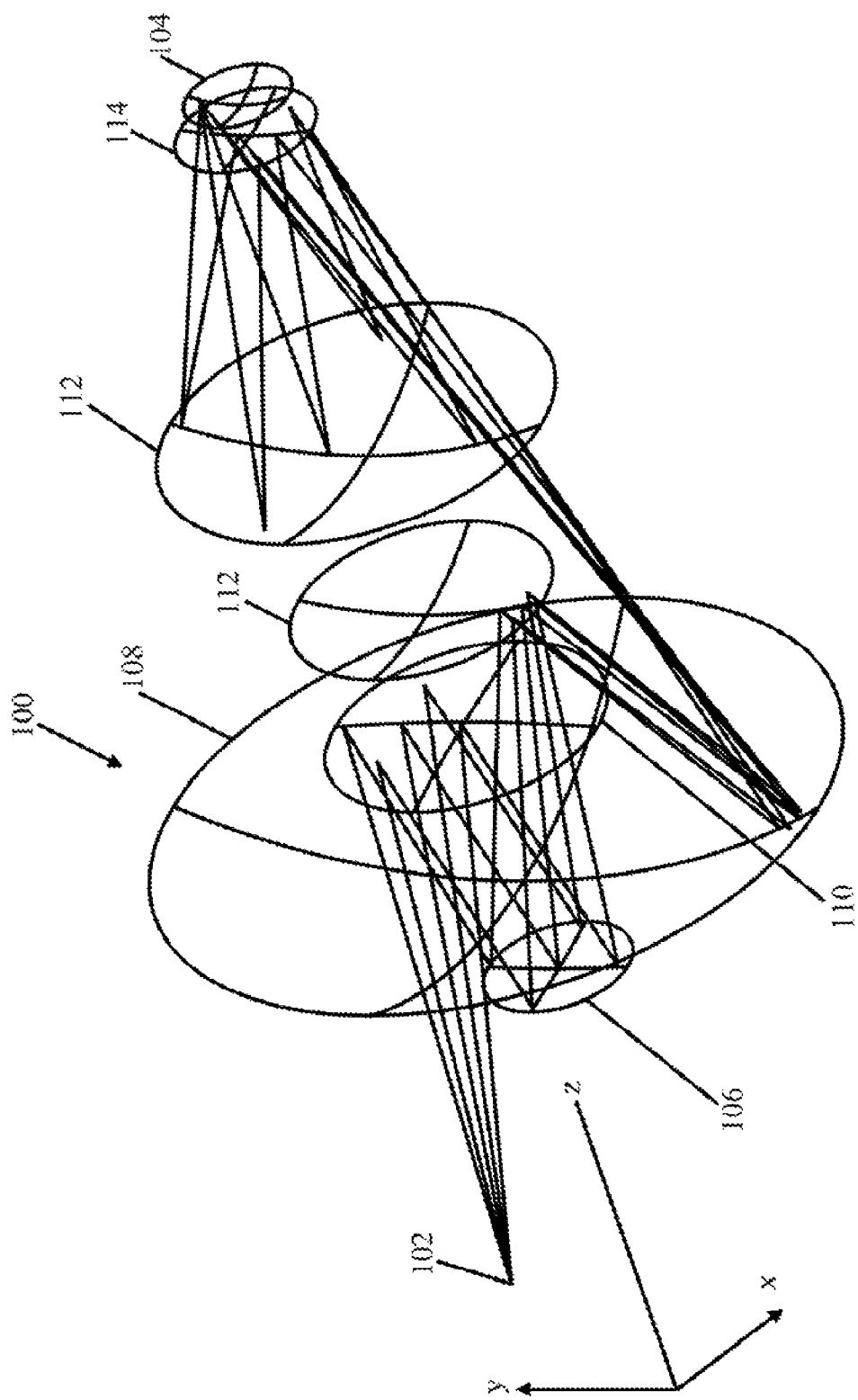
FIG. 1 is a schematic, three dimensional illustration of a six mirror optical structure designed according to the principles of the present invention, and which can be used in various imaging optical systems, including a lithographic imaging optical system.
Figure 2:
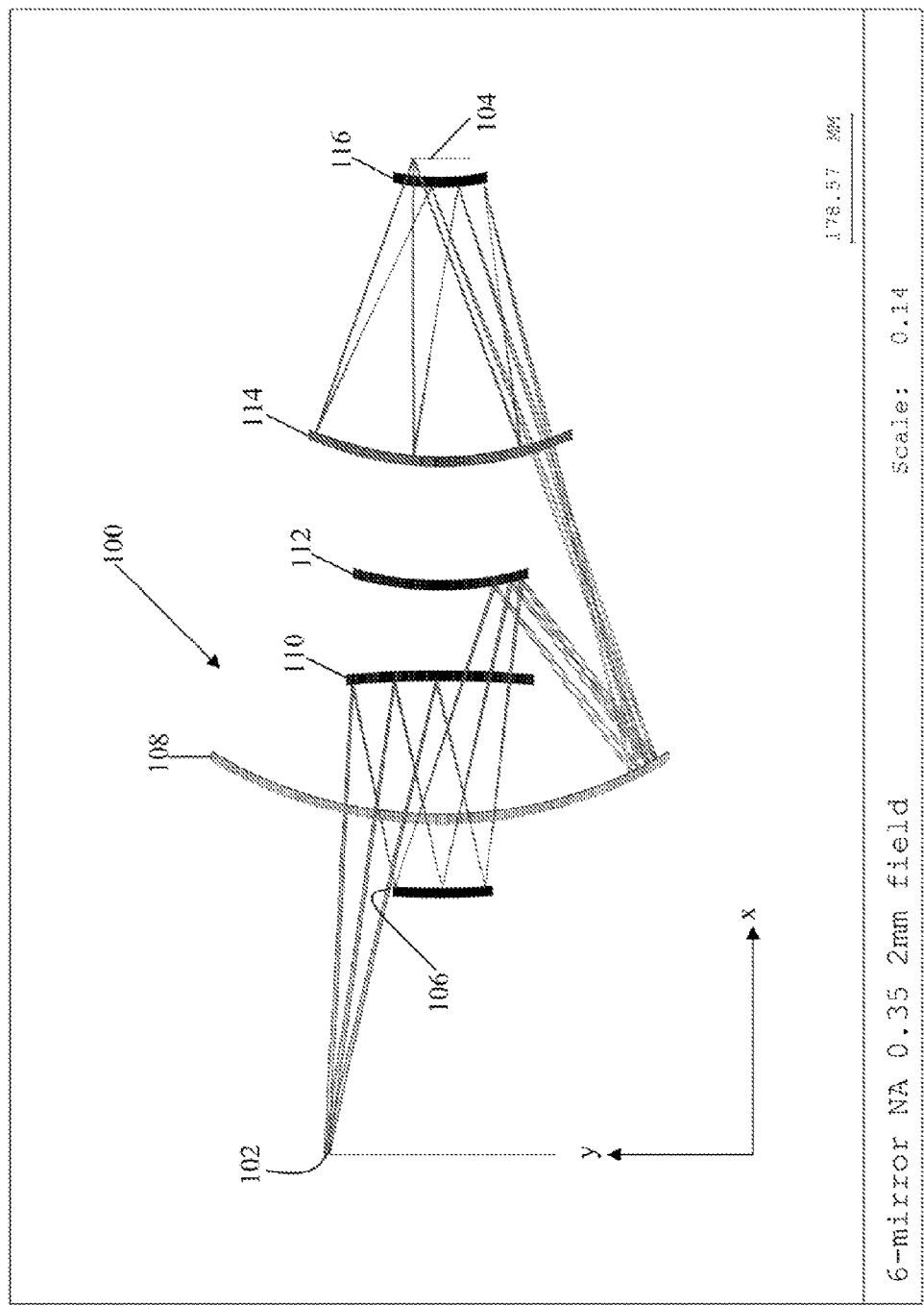
FIG. 2 is planar illustration of the six mirror optical system of FIG. 1, taken in the plane of symmetry of the optical structure.
Figure 3:
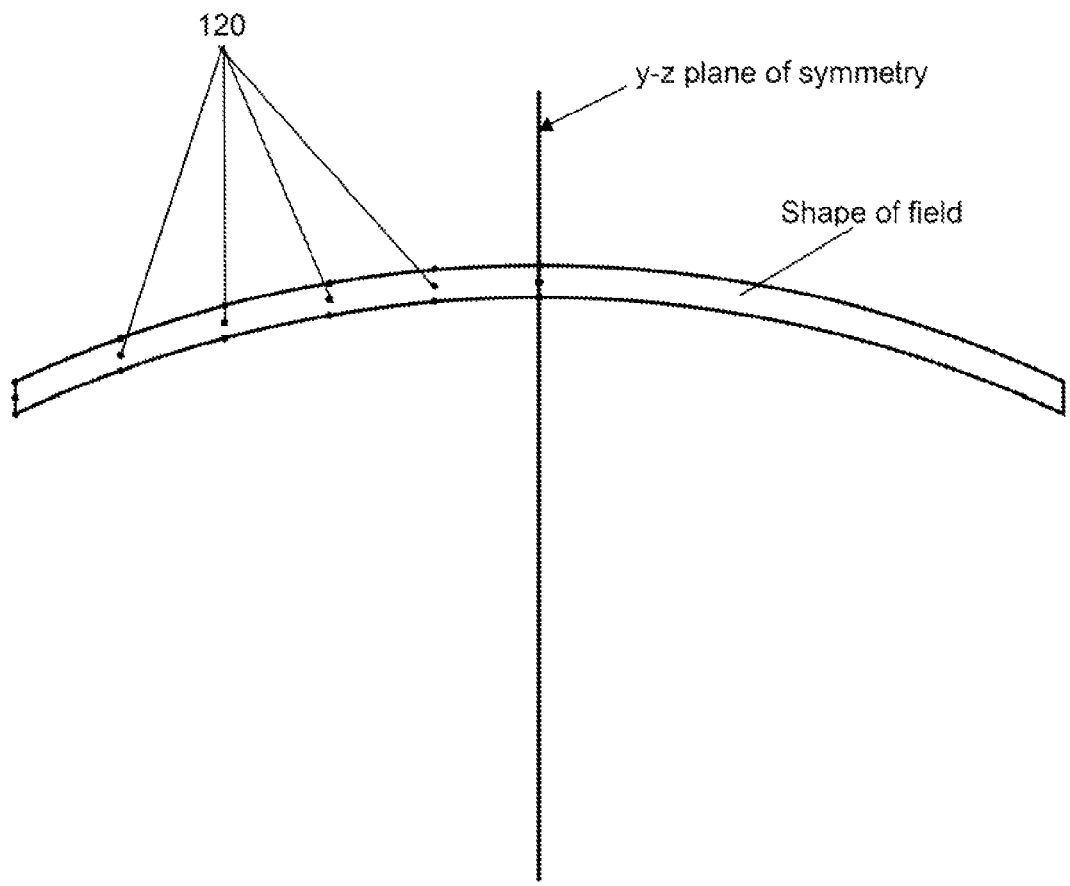
FIG. 3 is a schematic illustration of the manner in which field points are related to the plane of symmetry of the optical structure.

FIGS. 4a-4d provide a schematic illustration of the preferred manner in which an optical structure is designed, according to the principles of the present invention;

Table 1 is a prescription for the optical components of the optical structure of FIGS. 1-3, which prescription is used in the Y-Zernike description of the optical surfaces of the components of the optical structure; and Table 2 Shows relations of coefficients in prescription of Table 1 to Y-Zernike term $\{Z_p(\rho,\theta)\}$ in equations 1 and 3 of specification.

DETAILED DESCRIPTION

As set forth above, the present invention provides optical components, optical structures, and an optical structure design method, that are particularly useful in producing optical structure for an imaging optical system such as a lithographic imaging optical system. The principles of the present invention are described herein in connection with a preferred design of an optical structure for a micro lithographic imaging optical system. However, from the description, the manner in which the principles of the present invention can be used in producing optical structure and optical components for various other types of optical systems will become apparent to those in the art.

FIG. 1 illustrates the general configuration of an optical structure 100, according to the principles of the present invention, which can be used as part of a lithographic imaging optical system. The optical structure 100 would form part of a lithographic imaging optical system in which an object (e.g. a reticle) located at 102 is imaged (printed) to an image plane (e.g. a wafer) associated with a wafer 104. FIGS. 1 and 2 schematically illustrate the manner in which a single point on the object 102 is imaged to a point in the image plane 104, and those in the art will understand that all of the points on the reticle will be imaged to the wafer in a similar manner. Moreover, while the catoptric optical structure 100 that is provided according to the present invention is illustrated in the figures, the overall lithographic imaging optical system may include additional components that are well known to those in the art and should not require additional explanation.

As shown in FIGS. 1 and 2, the optical structure 100 is a catoptric imaging optical structure that is symmetric with respect to a Y-Z plane (that is shown as the Y-Z co-ordinate plane in FIG. 1), which is the plane of symmetry of the optical structure. By "symmetric with respect to a Y-Z plane", applicants mean that symmetry exists to each side of the Y-Z plane, as will be clearly understood by those in the art.

The preferred optical structure that is shown in FIGS. 1 and 2 comprises an arrangement of six (6) mirrors (106, 108, 110, 112, 114 and 116) arranged in the manner illustrated in FIGS. 1 and 2. The mirrors produce image transmission by reflection from their respective optical surfaces, in the manner shown by the ray diagrams shown in those figures. In the figures, the ray diagrams show the pattern and manner in which a point in an object plane 102 (e.g. a reticle of a lithographic imaging optical system) is transmitted to an image plane (e.g. the surface of a wafer 104 being imaged by the lithographic imaging optical system).

According to the principles of the present invention, at least one optical component of the optical structure 100 has an optical surface (i.e. the reflective surface of the optical component) that is described by a Y-Zernike polynomial, according to the principles of the present invention. In the optical structure of FIGS. 1 and 2, it is preferred that each of the optical surfaces of the six (6) mirrors (106, 108, 110, 112, 114, and 116) that form the optical structure is formed by a Y-Zernike polynomial.

The overall design of the optical structure 100 is also provided according to the principles of the present invention. The manner in which the optical structure 100 is designed can be further appreciated by reference to Table 1 and Table 2, and by the method steps shown in FIGS. 4a-4d.

The design process starts with providing a rotationally symmetric aspheric optical structure design that is preferably well corrected (see FIGS. 4a and 4d). The optical structure is rotationally symmetric about a plane of symmetry similar to the Y-Z plane of symmetry shown in FIG. 1.

Next, the optical surface(s) of one or more of the optical components of the rotationally symmetric optical structure are electronically converted to a Y-Zernike description. As shown in FIGS. 4b and 4c, a conventional Zernike polynomial is modified to a Y-Zernike polynomial by eliminating the sine terms (which are not symmetric with respect to the Y-Z plane, and by removing the constant components (either a "1" or a "−1") from the rotationally symmetric terms of the polynomial), and interfacing the description of the optical surfaces with an optimization program (e.g. CODE V from Optical Research Associates, Pasadena, Calif.) which is a well known optimization program) with coefficient descriptions as variables, and relating the coefficient descriptions to the formulas in equations 1 and 3 herein, in the manner shown in Table 2. The conversion is done electronically.

A prescription table, as shown in Table 1, is provided for each of the optical components, and the Y-Zernike polynomial for each of the components is further described in the following manner: the Y-Zernike polynomial that describes the surface is given by equation (1), with reference to Table 1 and Table 2, $$sag(r,\theta) = \frac{cr^2}{1+\sqrt{1-(1+k)c^2r^2}} + \sum_{p=1}^{N} A_p Z_p(r/R,\theta) \quad (1)$$

i. where c is the curvature of the surface given in Table 1 as "Curvature", k is the conic constant given in Table 1 as "C1", R is the normalizing radius given in Table 1 as "C2", and $\theta$ is the azimuthal angle measured from the y-axis and r the radial coordinate $r^2 = x^2 + y^2 x$;

ii. and where the individual polynomial terms of Equation (1) are defined by equations (2) through (5) as follows:

$$Q_n^m(\rho) = \sum_{t=0}^{n-m} [1 - \delta_{t,0}\delta_{m,0} + \delta_{n,0}\delta_{m,0}] \frac{(-1)^{n-m-t}(n+1)!}{(n-m-t)!(m+t)!t!} \rho^{2t} \quad (2)$$

$$Z_p(\rho,\theta) = Q_{n(p)}^{m(p)}(\rho)\rho^m \cos m\theta \quad (3)$$

$$n(p) = \left\lceil \frac{\sqrt{1+8p}-3}{2} \right\rceil \quad (4)$$

$$m(p) = \frac{1}{2}[2 - 2p + (3 + n(p))n(p)] \quad (5)$$

where $\rho$ is the normalized radial coordinate r/R, $\theta$ is the azimuthal coordinate measured from the y-axis, and $\delta_{ij}$ is the Kronecker delta defined by equation (4) as follows:

$$\delta_{i,j} = \begin{cases} 1, & \text{if } i = j \\ 0, & \text{if } i \neq j \end{cases} \quad (6)$$

Finally, a plurality of field points are provided that are out of the plane of symmetry (FIG. 3 schematically shows field points 120 that off axis with respect to the y-z plane of symmetry of the optical structure), and the optimization program is run to electronically optimize the description of the optical components so that good imaging is obtained at the plurality of field points. The optimization program can be a conventional optimization program such as CODE V (from Optical Research Associates), and that optimization program may result in some modification of the electronic Y-Zernike formulation produced by the conversion principles, Tables and formulations described above.

The foregoing technique is particularly useful in producing the optical structure of FIGS. 1 and 2, comprising an arrangement of six (6) mirrors, each of which has an optical surface described by the Y-Zernike polynomial, and which is designed to image at extreme ultraviolet (EUV) wavelengths, at a relatively high NA (e.g. 0.35), with a relatively large field of view (e.g. 26×2 mm). Moreover, the optical structure has a small departure from rotational asymmetry, which enables the components of the optical structure to be manufactured with current manufacturing techniques. Still further, the surface prescriptions of the 6 mirrors, shown in Table 1, reflects the best mirror surface prescriptions applicants have been able to produce thus far.

The following additional aspects of the present invention are noted.

a. In the optical structure described above, the mirror surfaces are described by a Zernike polynomial that is bilaterally symmetrical about the y-z plane of symmetry.

b. The curvatures and coefficients C1-C68 in Table 1 define the mirror surfaces the Y-Zernike polynomial, where specific surface descriptions is given by equations (1-4) in the manner described above. In those equations, it should be noted that the Kronecker delta in equation (2) acts to remove the constant sub-term from each rotationally symmetric Zernike term except for the first (p=1). The rotationally symmetric terms are all terms where m(p), given by equation 5, is zero. This is useful in optimization where one in the art may want to constrain the vertex of the surface while allowing the surface prescription to vary. When using the usual Zernike polynomial, the same effect can be accomplished by requiring the linear combination of the rotationally symmetric terms (including the first), each multiplied by an appropriate sign, to be zero, as given by, $$\sum_{p \text{ where } m(p)=0} (-1)^{n(p)} A_p = 0$$

c. In the formulation of the Y-Zernike description, it should be noted that the terms only include cosine and not sine. This means that the surface will have plane symmetry about the y-z plane, since B is measured in the x-y plane relative to the y-axis.

d. The coefficients $A_p$ in equation (1) are specified in Table 1 by the values C3-C68 and by the expressions C3-C68 in Table 2. Thus, given a given a particular CODE V Y-Zernike coefficient, Table 2 can be used to determine to which Y-Zernike term $Z(\rho,\theta)$ it is applied to.

e. Use of Y-Zernike polynomial surfaces in a catoptric annular-field projection optics design allows optimization to smaller residual design aberrations at a higher numerical aperture (NA). This 6-mirror design embodiment shown in FIGS. 1 and 2, (and described by the Y-Zernike in the manner described above) has residual wavefront aberrations at NA 0.35 of less than 20 milliwaves r.m.s. at 13.5 nm wavelength, which is not possible at an NA of 0.35 with 6 mirrors that use conventional rotationally symmetric aspheric surface prescriptions—such a conventional mirror arrangement has residual aberrations of the order of 40 milliwaves, or more.

f. This reduction in aberrations without an increase in the number of mirrors allows for higher Etendue, or light throughput, as well as higher resolution than known prior optical structures which provide an NA of 0.25.

g. This invention also differs from other prior optical structure designs that use mirror surfaces that are tilted and decentered by relatively large amounts, and provide a rectangular off-axis field. Such designs have surfaces that depart from spherical by at least an order of magnitude greater than conventional aspheric surfaces. This makes such designs difficult to manufacture, as well as to align.

h. In contrast, this invention uses Y-Zernike surfaces that have very small departures from rotational symmetry, as well as relatively small tilts and decenters. This results in little increase in manufacturing difficulty, compared to a conventional, rotationally symmetrical design. The particular Y-Zernike prescription described here allows for very high-order aberration correction, with the minimum increase in the number of coefficients used.

i. The design process described above can also be used to design optical structures more than 6 mirrors, and even higher NA's.

Thus, the foregoing description shows how optical components, optical structures, and an optical structure design method, are particularly useful in producing optical structure for an imaging optical system such as a lithographic imaging optical system. With the foregoing description in mind, the manner in which the principles of the present invention can be used in designing and producing optical structure and optical components for various other types of optical systems will become apparent to those in the art.

TABLE 1

| | | Lens design prescription | | | | | | | |
|---|---|---|---|---|---|---|---|---|---|
| ELT NO. | SUR NO. | SURFACE DESCRIPTION RADIUS | | THICKNESS SHAPE | APERTURE DESCRIPTION OR SEPARATION | DIMENSION | | SHAPE | MATERIAL |
| | | X | Y | | | X | Y | | |
| OBJECT | | | INF DECENTER(1) RETURN(1) DECENTER(2) | FLT | 373.5555 290.6198 | 286.158 | | CIR | |
| 1 | 1 | −1387.419 | −1387.419 RETURN(2) DECENTER(3) | X-1 | −290.6198 | 246.939 | | CIR | REFL |

TABLE 1-continued

| | | | | | | | | | |
|---|---|---|---|---|---|---|---|---|---|
| 2 (STOP) | 2 | 1122.075 | 1122.075 RETURN(3) | X-2 | 290.6198 | 131.021 | CIR | REFL |
| | | | DECENTER(4) | | 126.3694 | 196.584 | CIR | |
| | | | RETURN(4) DECENTER(5) | | | | | |
| 3 | 3 | 431.759 | 431.759 RETURN(5) | X-3 | −313.7772 | 230.004 | CIR | REFL |
| | | | DECENTER(6) | | | | | |
| 4 | 4 | 626.459 | 626.459 RETURN(6) | X-4 | 313.7772 | 604.976 | CIR | REFL |
| | | | DECENTER(7) | | 187.2522 | 404.930 | CIR | |
| | | | RETURN(7) DECENTER(8) | | 377.9733 | 311.398 | CIR | |
| | | | RETURN(8) DECENTER(9) | | | | | |
| 5 | 5 | 329.717 | 329.717 RETURN(9) | X-5 | −377.9733 | 123.460 | CIR | REFL |
| | | | DECENTER(10) | | | | | |
| 6 | 6 | 460.098 | 460.098 RETURN(10) | X-6 | 377.9733 | 348.675 | CIR | REFL |
| | | | DECENTER(11) | | 40.0000 | 101.130 | CIR | |
| | | | RETURN(11) | | | | | |
| IMAGE | | | INF | FLT | | 76.606 | | |

NOTES
Positive radius indicates the center of curvature is to the right
Negative radius indicates the center of curvature is to the left
Dimensions are given in millimeters
Thickness is axial distance to next surface, it is not a ray traced value
Image diameter shown above is a paraxial value

USER-DEFINED SURFACE

X-1 Curvature = −0.00072076
Coefficients

| | | | | | |
|---|---|---|---|---|---|
| C1: | 5.2798E+01 | C2: | 1.2719E+02 | C4: | −9.8887E−03 |
| C5: | 6.2724E−01 | C6: | −1.1066E−03 | C7: | −3.8750E−03 |
| C8: | 2.2787E−01 | C9: | 1.6380E−03 | C10: | −1.4346E−03 |
| C11: | 2.9736E−03 | C12: | 9.3233E−03 | C13: | 1.9551E−03 |
| C14: | −1.8903E−03 | C15: | −2.5138E−04 | C16: | 1.7255E−03 |
| C17: | 1.2885E−03 | C18: | −3.1946E−04 | C19: | 1.1387E−03 |
| C20: | −3.4525E−04 | C21: | −2.0820E−04 | C22: | 1.3833E−04 |
| C23: | 1.5646E−04 | C24: | −1.3160E−04 | C25: | −2.0587E−04 |
| C26: | 1.5850E−04 | C27: | −1.0931E−04 | C28: | 1.0703E−04 |
| C29: | −2.4598E−05 | C30: | 1.5835E−05 | C31: | 3.9164E−05 |
| C32: | 1.8948E−05 | C33: | −1.4687E−05 | C34: | 3.3846E−05 |
| C35: | −4.8827E−05 | C36: | 1.6689E−05 | C37: | 5.2552E−06 |
| C38: | 1.1237E−06 | C42: | −1.0846E−06 | C43: | 4.8892E−06 |
| C44: | −2.6512E−06 | C47: | 4.6068E−07 | C57: | −8.5906E−09 |
| C68: | −8.2777E−09 | | | | |

X-2 Curvature = 0.00089121
Coefficients

| | | | | | |
|---|---|---|---|---|---|
| C1: | 2.8388E+01 | C2: | 6.6119E+01 | C4: | −1.5736E−03 |
| C5: | −2.4466E−02 | C6: | −1.2953E−03 | C7: | −1.0541E−03 |
| C8: | −9.5807E−03 | C9: | 3.1336E−04 | C10: | 3.0215E−04 |
| C11: | −1.4207E−04 | C12: | −1.5706E−04 | C13: | 1.0856E−04 |
| C14: | −1.3617E−05 | C15: | 2.6195E−05 | C16: | −7.8512E−06 |
| C17: | −3.1846E−06 | C18: | 1.9690E−05 | C19: | 1.7892E−06 |
| C20: | −6.5948E−07 | C21: | 1.0386E−06 | C22: | 9.5016E−08 |
| C23: | −1.0776E−07 | C24: | 4.9908E−06 | C25: | −2.8855E−06 |
| C26: | −1.1075E−07 | C27: | 3.9682E−07 | C28: | −4.1933E−08 |
| C29: | 2.9915E−08 | C30: | 2.3816E−07 | C31: | 6.5334E−07 |
| C32: | 9.1705E−07 | C33: | 1.0973E−08 | C34: | −1.0170E−07 |
| C35: | 9.9970E−09 | C36: | −2.0972E−08 | C37: | −7.6183E−09 |
| C38: | 6.6739E−09 | C42: | 1.2997E−08 | C43: | −8.9046E−09 |
| C44: | −4.2078E−09 | C47: | 4.4788E−09 | C57: | 1.5650E−09 |
| C68: | 7.2447E−11 | | | | |

X-3 Curvature = 0.00231611
Coefficients

| | | | | | |
|---|---|---|---|---|---|
| C1: | 1.2510E+00 | C2: | 1.2068E+02 | C4: | 1.1522E−01 |
| C5: | −3.5797E−01 | C6: | −2.6265E−02 | C7: | 5.3692E−02 |
| C8: | −1.0414E−01 | C9: | −7.7178E−03 | C10: | 2.7560E−03 |
| C11: | 2.1791E−03 | C12: | −3.2571E−03 | C13: | −3.7642E−03 |
| C14: | −1.0624E−02 | C15: | −7.0824E−03 | C16: | −5.5291E−05 |
| C17: | −6.9262E−04 | C18: | 4.6743E−03 | C19: | 2.9687E−03 |
| C20: | 4.5728E−03 | C21: | 1.8314E−03 | C22: | −4.3207E−04 |
| C23: | 3.6422E−04 | C24: | 2.9237E−03 | C25: | 5.7692E−03 |
| C26: | 6.0452E−03 | C27: | 9.4911E−04 | C28: | −5.6513E−04 |

TABLE 1-continued

| | | | | | |
|---|---|---|---|---|---|
| C29: | 2.0399E−04 | C30: | −2.2426E−04 | C31: | 4.8206E−04 |
| C32: | 1.5237E−03 | C33: | 1.5634E−03 | C34: | −3.7348E−04 |
| C35: | −4.8347E−04 | C36: | 1.6371E−05 | C37: | −1.9704E−04 |
| C38: | −1.3170E−05 | C42: | −2.2948E−04 | C43: | −1.3355E−04 |
| C44: | 2.6221E−05 | C47: | −1.2368E−05 | C57: | 3.9842E−06 |
| C68: | −4.2831E−07 | | | | |

X-4 Curvature = 0.00159627
Coefficients

| | | | | | |
|---|---|---|---|---|---|
| C1: | 1.9854E−01 | C2: | 3.1899E+02 | C4: | 3.0795E−02 |
| C5: | −2.6277E−01 | C6: | −5.5353E−02 | C7: | 4.5439E−02 |
| C8: | −2.1035E−01 | C9: | 9.6739E−02 | C10: | −2.1786E−02 |
| C11: | 2.5629E−02 | C12: | 1.3730E−02 | C13: | 5.4911E−02 |
| C14: | −6.8087E−02 | C15: | −5.5512E−02 | C16: | 2.4269E−02 |
| C17: | 2.9262E−02 | C18: | 1.9287E−02 | C19: | −7.0356E−03 |
| C20: | −1.9754E−02 | C21: | −1.8090E−02 | C22: | 1.5128E−02 |
| C23: | −1.0504E−03 | C24: | 8.7483E−03 | C25: | 2.3009E−02 |
| C26: | 1.4136E−02 | C27: | −1.9442E−02 | C28: | −2.3227E−03 |
| C29: | 2.6954E−03 | C30: | 1.1983E−03 | C31: | 2.2852E−03 |
| C32: | 7.9873E−03 | C33: | 6.4840E−03 | C34: | −1.1120E−02 |
| C35: | −3.0587E−03 | C36: | 1.6831E−03 | C37: | −7.3523E−04 |
| C38: | 4.9386E−04 | C42: | −3.0773E−03 | C43: | −1.0664E−03 |
| C44: | 4.0343E−04 | C47: | −1.1213E−03 | C57: | 5.2361E−04 |
| C68: | −1.0930E−04 | | | | |

X-5 Curvature = 0.00303291
Coefficients

| | | | | | |
|---|---|---|---|---|---|
| C1: | 1.0992E+01 | C2: | 6.3545E+01 | C4: | −5.5362E−03 |
| C5: | −3.4799E−01 | C6: | −9.9330E−04 | C7: | −3.7701E−03 |
| C8: | −1.4292E−01 | C9: | 1.4433E−03 | C10: | 1.2057E−03 |
| C11: | 5.4292E−04 | C12: | −1.2428E−02 | C13: | −8.5597E−05 |
| C14: | −5.7493E−04 | C15: | −2.6719E−04 | C16: | 3.1392E−04 |
| C17: | −1.3759E−03 | C18: | 1.1350E−04 | C19: | −3.5613E−04 |
| C20: | −1.9692E−04 | C21: | 1.0671E−04 | C22: | 1.8460E−04 |
| C23: | −1.1433E−04 | C24: | 1.1420E−04 | C25: | −4.6426E−05 |
| C26: | −6.6611E−05 | C27: | 1.4511E−05 | C28: | 4.7120E−05 |
| C29: | 4.0680E−05 | C30: | −1.1041E−05 | C31: | 1.7401E−05 |
| C32: | −2.7128E−06 | C33: | −6.3270E−06 | C34: | −6.1950E−07 |
| C35: | 4.3018E−06 | C36: | 5.8635E−06 | C37: | 4.0266E−06 |
| C38: | −1.9728E−06 | C42: | −3.9985E−07 | C43: | 4.2724E−09 |
| C44: | 1.1001E−07 | C47: | −3.1221E−07 | C57: | −8.9544E−09 |
| C68: | 5.9851E−09 | | | | |

X-6 Curvature = 0.00217345
Coefficients

| | | | | | |
|---|---|---|---|---|---|
| C1: | 9.7253E−02 | C2: | 1.8502E+02 | C4: | −3.8183E−03 |
| C5: | −2.3092E−02 | C6: | −5.0623E−05 | C7: | −2.9848E−03 |
| C8: | −8.7959E−03 | C9: | 7.2165E−04 | C10: | −4.9929E−04 |
| C11: | −2.2740E−04 | C12: | −2.7205E−04 | C13: | −2.6565E−04 |
| C14: | 5.7022E−05 | C15: | −6.9984E−05 | C16: | −2.9775E−05 |
| C17: | −3.0666E−06 | C18: | 6.0086E−05 | C19: | −6.2481E−06 |
| C20: | −3.3665E−06 | C21: | 7.4664E−07 | C22: | −7.9678E−06 |
| C23: | 1.9727E−06 | C24: | −1.5850E−05 | C25: | −1.9509E−06 |
| C26: | 3.2228E−06 | C27: | −3.1938E−06 | C28: | 2.5537E−06 |
| C29: | −1.7791E−06 | C30: | 3.9407E−07 | C31: | 4.6565E−06 |
| C32: | −2.3351E−06 | C33: | −1.2811E−06 | C34: | 1.2907E−06 |
| C35: | −6.7795E−07 | C36: | 4.0965E−07 | C37: | −1.5790E−07 |
| C38: | 2.1499E−08 | C42: | −1.4290E−07 | C43: | 1.1330E−07 |
| C44: | −9.7558E−09 | C47: | 6.1672E−10 | C57: | 1.2833E−10 |
| C68: | −6.9606E−10 | | | | |

DECENTERING CONSTANTS

| DECENTER | X | Y | Z | ALPHA | BETA | GAMMA |
|---|---|---|---|---|---|---|
| D(1) (RETU) | 0.0000 | −2.9616 | 0.0000 | 0.2816 | 0.0000 | 0.0000 |
| D(2) (RETU) | 0.0000 | 0.8518 | 0.0000 | −0.0098 | 0.0000 | 0.0000 |
| D(3) (RETU) | 0.0000 | −2.9616 | 0.0000 | 0.2816 | 0.0000 | 0.0000 |
| D(4) (RETU) | 0.0000 | 0.8518 | 0.0000 | −0.0098 | 0.0000 | 0.0000 |
| D(5) (RETU) | 0.0000 | −0.1348 | 0.0000 | −0.0171 | 0.0000 | 0.0000 |
| D(6) (RETU) | 0.0000 | 0.0185 | 0.0000 | 0.0039 | 0.0000 | 0.0000 |
| D(7) (RETU) | 0.0000 | −0.1348 | 0.0000 | −0.0171 | 0.0000 | 0.0000 |

TABLE 1-continued

| | | | | | | |
|---|---|---|---|---|---|---|
| D(8) (RETU) | 0.0000 | −0.1730 | 0.0000 | −0.0205 | 0.0000 | 0.0000 |
| D(9) (RETU) | 0.0000 | 0.5304 | 0.0000 | 0.0200 | 0.0000 | 0.0000 |
| D(10) (RETU) | 0.0000 | −0.1730 | 0.0000 | −0.0205 | 0.0000 | 0.0000 |
| D(11) (RETU) | 0.0000 | 0.5304 | 0.0000 | 0.0200 | 0.0000 | 0.0000 |

A decenter defines a new coordinate system (displaced and/or rotated)
in which subsequent surfaces are defined.
Surfaces following a decenter are aligned on the local mechanical axis (z-axis) of the
new coordinate system.
The new mechanical axis remains in use until changed by another decenter.
The order in which displacements and tilts are applied on a given surface is specified
using different decenter types and these generate different new coordinate systems;
those used here are explained below.
Alpha, beta, and gamma are in degrees.

DECENTERING CONSTANT KEY:

| TYPE | TRAILING CODE | ORDER OF APPLICATION |
|---|---|---|
| DECENTER | | DISPLACE (X, Y, Z) |
| | | TILT (ALPHA, BETA, GAMMA) |
| | | REFRACT AT SURFACE |
| | | THICKNESS TO NEXT SURFACE |
| DECENTER & RETURN | RETU | DECENTER (X, Y, Z, ALPHA, BETA, GAMMA) |
| | | REFRACT AT SURFACE |
| | | RETURN (-GAMMA, -BETA, -ALPHA, -Z, -Y, -X) |
| | | THICKNESS TO NEXT SURFACE |

REFERENCE WAVELENGTH = 13.5 NM
This is a non-symmetric system.
If elements with power are decentered or tilted, the first order properties are probably
inadequate in describing the system characteristics.

| | X | Y |
|---|---|---|
| INFINITE CONJUGATES | | |
| EFL = | −243.6059 | −243.6059 |
| BFL = | −21.5773 | −21.5773 |
| FFL = | 590.3209 | 590.3209 |
| F/NO = | −1.1910 | −1.1910 |
| AT USED CONJUGATES | | |
| REDUCTION = | −0.2527 | −0.2527 |
| FINITE F/NO = | −1.4442 | −1.4442 |
| OBJECT DIST = | 373.5555 | 373.5555 |
| TOTAL TRACK = | 1395.7702 | 1395.7702 |
| IMAGE DIST = | 40.0000 | 40.0000 |
| OAL = | 982.2147 | 982.2147 |
| PARAXIAL | | |
| IMAGE HT = | 0.0000 | 40.9432 |
| IMAGE DIST = | 39.9906 | 39.9906 |
| SEMI-FIELD | | |
| ANGLE = | 0.0000 | 8.2507 |
| ENTR PUPIL | | |
| DIAMETER = | 204.5416 | 204.5416 |
| DISTANCE = | 790.7710 | 790.7710 |
| EXIT PUPIL | | |
| DIAMETER = | 248.5784 | 248.5784 |
| DISTANCE = | −317.6303 | −317.6303 |

NOTES
FFL is measured from the first surface
BFL is measured from the last surface

TABLE 2

Shows relations of coefficients in prescription of Table 1 to Y-Zernike term $\{Z_p(\rho, \theta)\}$ in equations 1 and 3 of specification

| CodeV Coefficient $\{A_p\}$ | p | Y-Zernike Term $\{Z_p(\rho, \theta)\}$ |
|---|---|---|
| C3 | 1 | 1 |
| C4 | 2 | $\rho*\cos[\theta]$ |
| C5 | 3 | $2*\rho\hat{\,}2$ |
| C6 | 4 | $\rho\hat{\,}2*\cos[2*\theta]$ |
| C7 | 5 | $\rho*(-2 + 3*\rho\hat{\,}2)*\cos[\theta]$ |
| C8 | 6 | $-6*\rho\hat{\,}2 + 6*\rho\hat{\,}4$ |
| C9 | 7 | $\rho\hat{\,}3*\cos[3*\theta]$ |
| C10 | 8 | $\rho\hat{\,}2*(-3 + 4*\rho\hat{\,}2)*\cos[2*\theta]$ |
| C11 | 9 | $\rho*(3 - 12*\rho\hat{\,}2 + 10*\rho\hat{\,}4)*\cos[\theta]$ |
| C12 | 10 | $12*\rho\hat{\,}2 - 30*\rho\hat{\,}4 + 20*\rho\hat{\,}6$ |
| C13 | 11 | $\rho\hat{\,}4*\cos[4*\theta]$ |
| C14 | 12 | $\rho\hat{\,}3*(-4 + 5*\rho\hat{\,}2)*\cos[3*\theta]$ |
| C15 | 13 | $\rho\hat{\,}2*(6 - 20*\rho\hat{\,}2 + 15*\rho\hat{\,}4)*\cos[2*\theta]$ |
| C16 | 14 | $\rho*(-4 + 30*\rho\hat{\,}2 - 60*\rho\hat{\,}4 + 35*\rho\hat{\,}6)*\cos[\theta]$ |
| C17 | 15 | $-20*\rho\hat{\,}2 + 90*\rho\hat{\,}4 - 140*\rho\hat{\,}6 + 70*\rho\hat{\,}8$ |
| C18 | 16 | $\rho\hat{\,}5*\cos[5*\theta]$ |
| C19 | 17 | $\rho\hat{\,}4*(-5 + 6*\rho\hat{\,}2)*\cos[4*\theta]$ |
| C20 | 18 | $\rho\hat{\,}3*(10 - 30*\rho\hat{\,}2 + 21*\rho\hat{\,}4)*\cos[3*\theta]$ |
| C21 | 19 | $\rho\hat{\,}2*(-10 + 60*\rho\hat{\,}2 - 105*\rho\hat{\,}4 + 56*\rho\hat{\,}6)*\cos[2*\theta]$ |
| C22 | 20 | $\rho*(5 - 60*\rho\hat{\,}2 + 210*\rho\hat{\,}4 - 280*\rho\hat{\,}6 + 126*\rho\hat{\,}8)*\cos[\theta]$ |
| C23 | 21 | $30*\rho\hat{\,}2 - 210*\rho\hat{\,}4 + 560*\rho\hat{\,}6 - 630*\rho\hat{\,}8 + 252*\rho\hat{\,}10$ |
| C24 | 22 | $\rho\hat{\,}6*\cos[6*\theta]$ |
| C25 | 23 | $\rho\hat{\,}5*(-6 + 7*\rho\hat{\,}2)*\cos[5*\theta]$ |
| C26 | 24 | $\rho\hat{\,}4*(15 - 42*\rho\hat{\,}2 + 28*\rho\hat{\,}4)*\cos[4*\theta]$ |
| C27 | 25 | $\rho\hat{\,}3*(-20 + 105*\rho\hat{\,}2 - 168*\rho\hat{\,}4 + 84*\rho\hat{\,}6)*\cos[3*\theta]$ |
| C28 | 26 | $\rho\hat{\,}2*(15 - 140*\rho\hat{\,}2 + 420*\rho\hat{\,}4 - 504*\rho\hat{\,}6 + 210*\rho\hat{\,}8)*\cos[2*\theta]$ |
| C29 | 27 | $\rho*(-6 + 105*\rho\hat{\,}2 - 560*\rho\hat{\,}4 + 1260*\rho\hat{\,}6 - 1260*\rho\hat{\,}8 + 462*\rho\hat{\,}10)*\cos[\theta]$ |
| C30 | 28 | $-42*\rho\hat{\,}2 + 420*\rho\hat{\,}4 - 1680*\rho\hat{\,}6 + 3150*\rho\hat{\,}8 - 2772*\rho\hat{\,}10 + 924*\rho\hat{\,}12$ |
| C31 | 29 | $\rho\hat{\,}7*\cos[7*\theta]$ |
| C32 | 30 | $\rho\hat{\,}6*(-7 + 8*\rho\hat{\,}2)*\cos[6*\theta]$ |
| C33 | 31 | $\rho\hat{\,}5*(21 - 56*\rho\hat{\,}2 + 36*\rho\hat{\,}4)*\cos[5*\theta]$ |
| C34 | 32 | $\rho\hat{\,}4*(-35 + 168*\rho\hat{\,}2 - 252*\rho\hat{\,}4 + 120*\rho\hat{\,}6)*\cos[4*\theta]$ |
| C35 | 33 | $\rho\hat{\,}3*(35 - 280*\rho\hat{\,}2 + 756*\rho\hat{\,}4 - 840*\rho\hat{\,}6 + 330*\rho\hat{\,}8)*\cos[3*\theta]$ |
| C36 | 34 | $\rho\hat{\,}2*(-21 + 280*\rho\hat{\,}2 - 1260*\rho\hat{\,}4 + 2520*\rho\hat{\,}6 - 2310*\rho\hat{\,}8 + 792*\rho\hat{\,}10)*\cos[2*\theta]$ |
| C37 | 35 | $\rho*(7 - 168*\rho\hat{\,}2 + 1260*\rho\hat{\,}4 - 4200*\rho\hat{\,}6 + 6930*\rho\hat{\,}8 - 5544*\rho\hat{\,}10 + 1716*\rho\hat{\,}12)*\cos[\theta]$ |
| C38 | 36 | $56*\rho\hat{\,}2 - 756*\rho\hat{\,}4 + 4200*\rho\hat{\,}6 - 11550*\rho\hat{\,}8 + 16632*\rho\hat{\,}10 - 12012*\rho\hat{\,}12 + 3432*\rho\hat{\,}14$ |
| C39 | 37 | $\rho\hat{\,}8*\cos[8*\theta]$ |
| C40 | 38 | $\rho\hat{\,}7*(-8 + 9*\rho\hat{\,}2)*\cos[7*\theta]$ |
| C41 | 39 | $\rho\hat{\,}6*(28 - 72*\rho\hat{\,}2 + 45*\rho\hat{\,}4)*\cos[6*\theta]$ |
| C42 | 40 | $\rho\hat{\,}5*(-56 + 252*\rho\hat{\,}2 - 360*\rho\hat{\,}4 + 165*\rho\hat{\,}6)*\cos[5*\theta]$ |
| C43 | 41 | $\rho\hat{\,}4*(70 - 504*\rho\hat{\,}2 + 1260*\rho\hat{\,}4 - 1320*\rho\hat{\,}6 + 495*\rho\hat{\,}8)*\cos[4*\theta]$ |
| C44 | 42 | $\rho\hat{\,}3*(-56 + 630*\rho\hat{\,}2 - 2520*\rho\hat{\,}4 + 4620*\rho\hat{\,}6 - 3960*\rho\hat{\,}8 + 1287*\rho\hat{\,}10)*\cos[3*\theta]$ |
| C45 | 43 | $\rho\hat{\,}2*(28 - 504*\rho\hat{\,}2 + 3150*\rho\hat{\,}4 - 9240*\rho\hat{\,}6 + 13860*\rho\hat{\,}8 - 10296*\rho\hat{\,}10 + 3003*\rho\hat{\,}12)*\cos[2*\theta]$ |
| C46 | 44 | $\rho*(-8 + 252*\rho\hat{\,}2 - 2520*\rho\hat{\,}4 + 11550*\rho\hat{\,}6 - 27720*\rho\hat{\,}8 + 36036*\rho\hat{\,}10 - 24024*\rho\hat{\,}12 + 6435*\rho\hat{\,}14)*\cos[\theta]$ |
| C47 | 45 | $-72*\rho\hat{\,}2 + 1260*\rho\hat{\,}4 - 9240*\rho\hat{\,}6 + 34650*\rho\hat{\,}8 - 72072*\rho\hat{\,}10 + 84084*\rho\hat{\,}12 - 51480*\rho\hat{\,}14 + 12870*\rho\hat{\,}16$ |
| C48 | 46 | $\rho\hat{\,}9*\cos[9*\theta]$ |
| C49 | 47 | $\rho\hat{\,}8*(-9 + 10*\rho\hat{\,}2)*\cos[8*\theta]$ |
| C50 | 48 | $\rho\hat{\,}7*(36 - 90*\rho\hat{\,}2 + 55*\rho\hat{\,}4)*\cos[7*\theta]$ |
| C51 | 49 | $\rho\hat{\,}6*(-84 + 360*\rho\hat{\,}2 - 495*\rho\hat{\,}4 + 220*\rho\hat{\,}6)*\cos[6*\theta]$ |
| C52 | 50 | $\rho\hat{\,}5*(126 - 840*\rho\hat{\,}2 + 1980*\rho\hat{\,}4 - 1980*\rho\hat{\,}6 + 715*\rho\hat{\,}8)*\cos[5*\theta]$ |
| C53 | 51 | $\rho\hat{\,}4*(-126 + 1260*\rho\hat{\,}2 - 4620*\rho\hat{\,}4 + 7920*\rho\hat{\,}6 - 6435*\rho\hat{\,}8 + 2002*\rho\hat{\,}10)*\cos[4*\theta]$ |
| C54 | 52 | $\rho\hat{\,}3*(84 - 1260*\rho\hat{\,}2 + 6930*\rho\hat{\,}4 - 18480*\rho\hat{\,}6 + 25740*\rho\hat{\,}8 - 18018*\rho\hat{\,}10 + 5005*\rho\hat{\,}12)*\cos[3*\theta]$ |
| C55 | 53 | $\rho\hat{\,}2*(-36 + 840*\rho\hat{\,}2 - 6930*\rho\hat{\,}4 + 27720*\rho\hat{\,}6 - 60060*\rho\hat{\,}8 + 72072*\rho\hat{\,}10 - 45045*\rho\hat{\,}12 + 11440*\rho\hat{\,}14)*\cos[2*\theta]$ |
| C56 | 54 | $\rho*(9 - 360*\rho\hat{\,}2 + 4620*\rho\hat{\,}4 - 27720*\rho\hat{\,}6 + 90090*\rho\hat{\,}8 - 168168*\rho\hat{\,}10 + 180180*\rho\hat{\,}12 - 102960*\rho\hat{\,}14 + 24310*\rho\hat{\,}16)*\cos[\theta]$ |
| C57 | 55 | $90*\rho\hat{\,}2 - 1980*\rho\hat{\,}4 + 18480*\rho\hat{\,}6 - 90090*\rho\hat{\,}8 + 252252*\rho\hat{\,}10 - 420420*\rho\hat{\,}12 + 411840*\rho\hat{\,}14 - 218790*\rho\hat{\,}16 + 48620*\rho\hat{\,}18$ |
| C58 | 56 | $\rho\hat{\,}10*\cos[10*\theta]$ |
| C59 | 57 | $\rho\hat{\,}9*(-10 + 11*\rho\hat{\,}2)*\cos[9*\theta]$ |
| C60 | 58 | $\rho\hat{\,}8*(45 - 110*\rho\hat{\,}2 + 66*\rho\hat{\,}4)*\cos[8*\theta]$ |
| C61 | 59 | $\rho\hat{\,}7*(-120 + 495*\rho\hat{\,}2 - 660*\rho\hat{\,}4 + 286*\rho\hat{\,}6)*\cos[7*\theta]$ |
| C62 | 60 | $\rho\hat{\,}6*(210 - 1320*\rho\hat{\,}2 + 2970*\rho\hat{\,}4 - 2860*\rho\hat{\,}6 + 1001*\rho\hat{\,}8)*\cos[6*\theta]$ |
| C63 | 61 | $\rho\hat{\,}5*(-252 + 2310*\rho\hat{\,}2 - 7920*\rho\hat{\,}4 + 12870*\rho\hat{\,}6 - 10010*\rho\hat{\,}8 + 3003*\rho\hat{\,}10)*\cos[5*\theta]$ |
| C64 | 62 | $\rho\hat{\,}4*(210 - 2772*\rho\hat{\,}2 + 13860*\rho\hat{\,}4 - 34320*\rho\hat{\,}6 + 45045*\rho\hat{\,}8 - 30030*\rho\hat{\,}10 + 8008*\rho\hat{\,}12)*\cos[4*\theta]$ |
| C65 | 63 | $\rho\hat{\,}3*(-120 + 2310*\rho\hat{\,}2 - 16632*\rho\hat{\,}4 + 60060*\rho\hat{\,}6 - 120120*\rho\hat{\,}8 + 135135*\rho\hat{\,}10 - 80080*\rho\hat{\,}12 + 19448*\rho\hat{\,}14)*\cos[3*\theta]$ |
| C66 | 64 | $\rho\hat{\,}2*(45 - 1320*\rho\hat{\,}2 + 13860*\rho\hat{\,}4 - 72072*\rho\hat{\,}6 + 210210*\rho\hat{\,}8 - 360360*\rho\hat{\,}10 + 360360*\rho\hat{\,}12 - 194480*\rho\hat{\,}14 + 43758*\rho\hat{\,}16)*\cos[2*\theta]$ |
| C67 | 65 | $\rho*(-10 + 495*\rho\hat{\,}2 - 7920*\rho\hat{\,}4 + 60060*\rho\hat{\,}6 - 252252*\rho\hat{\,}8 + 630630*\rho\hat{\,}10 - 960960*\rho\hat{\,}12 + 875160*\rho\hat{\,}14 - 437580*\rho\hat{\,}16 + 92378*\rho\hat{\,}18)*\cos[\theta]$ |
| C68 | 66 | $-110*\rho\hat{\,}2 + 2970*\rho\hat{\,}4 - 34320*\rho\hat{\,}6 + 210210*\rho\hat{\,}8 - 756756*\rho\hat{\,}10 + 1681680*\rho\hat{\,}12 - 2333760*\rho\hat{\,}14 + 1969110*\rho\hat{\,}16 - 923780*\rho\hat{\,}18 + 184756*\rho\hat{\,}20$ |

The invention claimed is:

1. An optical mirror component for a projection optics system, the optical mirror component comprising an optical surface that is described by a Y-Zernike polynomial.

2. The optical mirror component of claim 1, wherein the Y-Zernike polynomial is described in the following manner:
   a. the Y-Zernike polynomial that describes the surface is given by equation (1), with reference to Table 1 and Table 2, $$sag(r, \theta) = \frac{cr^2}{1 + \sqrt{1 - (1+k)c^2 r^2}} + \sum_{p=1}^{N} A_p Z_p(r/R, \theta) \quad (1)$$

i. where c is the curvature of the surface given in Table 1 as "Curvature", k is the conic constant given in Table 1 as "C1", R is the normalizing radius given in Table 1 as "C2", and $\theta$ is the azimuthal angle measured from the y-axis and r the radial coordinate $r^2 = x^2 + y^2 x$;
   ii. and where the individual polynomial terms of Equation (1) are defined by equations (2) through (5), with reference to Table 2, as follows:

$$Q_n^m(\rho) = \sum_{t=0}^{n-m} [1 - \delta_{t,0}\delta_{m,0} + \delta_{n,0}\delta_{m,0}] \frac{(-1)^{n-m-t}(n+1)!}{(n-m-t)!(m+t)!t!} \rho^{2t} \quad (2)$$

$$Z_p(\rho, \theta) = Q_{n(p)}^{m(p)}(\rho)\rho^m \cos m\theta \quad (3)$$

$$n(p) = \left\lceil \frac{\sqrt{1+8p} - 3}{2} \right\rceil \quad (4)$$

$$m(p) = \frac{1}{2}[2 - 2p + (3 + n(p))n(p)] \quad (5)$$

where ρ is the normalized radial coordinate r/R, θ is the azimuthal coordinate measured from the y-axis, and $\delta_{ij}$ is the Kronecker delta defined by equation (6) as follows:

$$\delta_{i,j} = \begin{cases} 1, \text{if } i = j \\ 0, \text{if } i \neq j \end{cases}. \quad (6)$$

3. An optical projection structure for a projection optics system, the optical projection structure comprising one or more projection optics, at least one of which has an optical surface described by a Y-Zernike polynomial.

4. The optical projection structure of claim 3, wherein in the optical projection structure comprises an arrangement of six (6) mirrors, at least one of which has an optical surface described by a Y-Zernike polynomial.

5. The optical projection structure of claim 4, wherein all six mirrors have optical surfaces, and each of those optical surfaces is described by a Y-Zernike polynomial.

6. The optical projection structure of claim 5, wherein the six mirrors have the prescriptions described in Table 1.

7. The optical projection structure of claim 4, wherein the six mirrors have the prescriptions described in Table 1.

8. The optical projection structure of claim 4, wherein the optical projection structure is configured with a 0.35 NA and an instantaneous field of view of 26×2 mm.

9. The optical projection structure of claim 8, wherein each of the six optical surfaces that are described by a Y-Zernike polynomial is bilaterally symmetrical about a plane of symmetry of the optical projection structure.

10. The optical projection structure of claim 9, wherein the optical projection structure is anamorphic with respect to the plane of symmetry of the optical projection structure.

11. The optical projection structure of claim 6, wherein the optical projection structure is anamorphic in a plane of symmetry of the optical projection structure.

12. The optical projection structure of claim 4, wherein the optical projection structure is anamorphic in a plane of symmetry of the optical projection structure.

13. The optical projection structure of claim 6, wherein the Y-Zernike polynomial that describes each of the surfaces is described in the following manner:

a. the Y-Zernike polynomial that describes the surface is given by equation (1), with reference to Table 1 and Table 2, $$sag(r, \theta) = \frac{cr^2}{1 + \sqrt{1 - (1+k)c^2 r^2}} + \sum_{p=1}^{N} A_p Z_p(r/R, \theta) \quad (1)$$

i. where c is the curvature of the surface given in Table 1 as "Curvature", k is the conic constant given in Table 1 as "C1", R is the normalizing radius given in Table 1 as "C2", and θ is the azimuthal angle measured from the y-axis and r the radial coordinate $r^2 = x^2 + y^2$;

ii. and where the individual polynomial terms of Equation (1) are defined by equations (2) through (5), with reference to Table 2, as follows:

$$Q_n^m(\rho) = \sum_{t=0}^{n-m} [1 - \delta_{t,0}\delta_{m,0} + \delta_{n,0}\delta_{m,0}] \frac{(-1)^{n-m-t}(n+1)!}{(n-m-t)!(m+t)!t!} \rho^{2t} \quad (2)$$

$$Z_p(\rho, \theta) = Q_{n(p)}^{m(p)}(\rho)\rho^m \cos m\theta \quad (3)$$

$$n(p) = \left\lceil \frac{\sqrt{1+8p} - 3}{2} \right\rceil \quad (4)$$

$$m(p) = \frac{1}{2}[2 - 2p + (3 + n(p))n(p)] \quad (5)$$

where ρ is the normalized radial coordinate r/R, θ is the azimuthal coordinate measured from the y-axis, and $\delta_{ij}$ is the Kronecker delta defined by equation (6) as follows:

$$\delta_{i,j} = \begin{cases} 1, \text{if } i = j \\ 0, \text{if } i \neq j \end{cases}. \quad (6)$$

14. The optical structure of claim 4, wherein the optical structure forms part of a microlithography optical imaging system.

15. The optical structure of claim 6, wherein the optical structure forms part of a microlithography optical imaging system.

16. The optical structure of claim 3, wherein the optical structure forms part of a microlithography optical imaging system.

17. A method of designing an optical structure, comprising
a. providing a rotationally symmetric aspheric optical structure design,
b. electronically converting the optical surface(s) of one or more of the optical components of the rotationally symmetric optical structure to a Y-Zernike description,
c. providing a plurality of field points that are out of a plane of symmetry, and
d. electronically optimizing the description of the one or more components at the plurality of field points.

18. The method of claim 17, wherein electronically converting the optical surface(s) of one or more optical components comprises electronically converting the optical surface(s) of one or more of the optical components of the rotationally symmetric optical structure to a Y-Zernike description that is anamorphic with respect to the plane of symmetry of the optical structure.

19. The method of claim 18, wherein the Y-Zernike polynomial that is used to electronically convert the optical surface(s) of one or more of the optical components of the rotationally symmetric optical structure to a Y-Zernike description, is provided in the following manner:

a. the Y-Zernike polynomial that describes the surface is given by equation (1), with reference to Table 1 and Table 2, $$sag(r, \theta) = \frac{cr^2}{1 + \sqrt{1 - (1+k)c^2 r^2}} + \sum_{p=1}^{N} A_p Z_p(r/R, \theta) \quad (1)$$

i. where c is the curvature of the surface given in Table 1 as "Curvature", k is the conic constant given in Table 1 as "C1", R is the normalizing radius given in Table 1 as "C2", and θ is the azimuthal angle measured from the y-axis and r the radial coordinate $r^2=x^2+y^2$;

ii. and where the individual polynomial terms of Equation (1) are defined by equations (2) through (5), with reference to Table 2, as follows:

$$Q_n^m(\rho) = \sum_{t=0}^{n-m} [1 - \delta_{t,0}\delta_{m,0} + \delta_{n,0}\delta_{m,0}] \frac{(-1)^{n-m-t}(n+1)!}{(n-m-t)!(m+t)!t!}\rho^{2t} \quad (2)$$

$$Z_p(\rho, \theta) = Q_{n(p)}^{m(p)}(\rho)\rho^m \cos m\theta \quad (3)$$

$$n(p) = \left\lceil \frac{\sqrt{1+8p}-3}{2} \right\rceil \quad (4)$$

$$m(p) = \frac{1}{2}[2 - 2p + (3 + n(p))n(p)] \quad (5)$$

where ρ is the normalized radial coordinate r/R, θ is the azimuthal coordinate measured from the y-axis, and $\delta_{ij}$ is the Kronecker delta defined by equation (6) as follows:

$$\delta_{i,j} = \begin{cases} 1, \text{ if } i = j \\ 0, \text{ if } i \neq j \end{cases}. \quad (6)$$

20. The method of claim 19, wherein an optical structure is designed that comprises an arrangement of six (6) mirrors, each of which has an optical surface described by a Y-Zernike polynomial in accordance with the process of claim 19, wherein the six mirrors have the prescriptions of Table 1, and wherein the optical projection structure is configured with a 0.35 NA and an instantaneous field of view of 26×2 mm.

21. The optical projection structure of claim 4, wherein all six mirrors form a catoptric rotationally symmetric aspheric optical system, and the optical surface of each of the 6 mirrors is described by a Y-Zernike polynomial.

* * * * *